(12) United States Patent
Bates et al.

(10) Patent No.: US 9,154,637 B2
(45) Date of Patent: Oct. 6, 2015

(54) LINE SEIZURE IN AN ALARM SYSTEM HAVING AN ALARM SIGNAL PROCESSING DEVICE

(71) Applicant: Cellco Partnership, Basking Ridge, NJ (US)

(72) Inventors: Peter C. Bates, Morristown, NJ (US); Edward Gruskin, Verona, NJ (US); Nishit Oza, North Andover, MA (US)

(73) Assignee: Cellco Partnership, Basking Ridge, NJ (US)

( * ) Notice: Subject to any disclaimer, the term of this patent is extended or adjusted under 35 U.S.C. 154(b) by 71 days.

(21) Appl. No.: 13/970,259

(22) Filed: Aug. 19, 2013

(65) Prior Publication Data

US 2015/0049865 A1 Feb. 19, 2015

(51) Int. Cl.
*H04M 11/04* (2006.01)
*G08B 27/00* (2006.01)

(52) U.S. Cl.
CPC ............. *H04M 11/04* (2013.01); *G08B 27/006* (2013.01)

(58) Field of Classification Search
None
See application file for complete search history.

(56) References Cited

U.S. PATENT DOCUMENTS

| | | | | |
|---|---|---|---|---|
| 4,993,059 | A * | 2/1991 | Smith et al. | 379/39 |
| 2003/0128115 | A1* | 7/2003 | Giacopelli et al. | 340/506 |
| 2004/0151282 | A1* | 8/2004 | Jones et al. | 379/37 |
| 2005/0031091 | A1* | 2/2005 | Elliot | 379/37 |
| 2008/0309449 | A1* | 12/2008 | Martin et al. | 340/3.1 |
| 2010/0002680 | A1* | 1/2010 | Petricoin, Jr. | 370/352 |
| 2012/0250834 | A1* | 10/2012 | Smith et al. | 379/45 |

* cited by examiner

*Primary Examiner* — Maria El-Zoobi (57) ABSTRACT

A system and method of seizing a landline is disclosed. In seizing the landline, a first device may identify that a switch has been toggled by a second device; receive an alarm signal from the second device via a landline based on identifying that the switch has been toggled; determine a particular processing instruction, of one or more processing instructions, based on information included in the alarm signal; and execute the particular processing instruction to provide the alarm signal to a third device.

20 Claims, 10 Drawing Sheets

| Processing Instructions 510 | |
|---|---|
| Terminal ID | Instructions |
| 1 | Forward alarm signal as DTMF to telephone number 555-555-1111 |
| 2 | -Translate alarm signal to packet-based message<br>-Provide to IP address 1.1.1.1 |
| 3 | -Forward alarm signal as DTMF to telephone number 555-555-2222<br>-Establish VoIP session |
| 1,2 | -Translate alarm signal to packet-based message<br>-Provide to IP address 1.1.1.1<br>-Provide to IP address 1.1.1.2 |

Fig. 7B

LINE SEIZURE IN AN ALARM SYSTEM HAVING AN ALARM SIGNAL PROCESSING DEVICE

BACKGROUND

An alarm system includes an alarm panel to provide alarm messages to an alarm monitoring station via an analog landline telephone network, such as an analog Public Switched Telephone Network (PSTN) and/or an analog plain old telephone service (POTS) network. The alarm panel may provide the alarm message, via the analog landline telephone network, by placing a telephone call and sending a dual-tone multi-frequency (DTMF) signal (e.g., a series of audible tones approximately 50 milliseconds (ms) to approximately 100 ms in length). The alarm panel may need to disconnect devices in a telephone network, associated with the facility (e.g., a facility telephone network), to ensure that the facility telephone network is available for use by the alarm system to place the telephone call. The alarm system may include an alarm signal processing device that interferes with a disconnection switch that is used to disconnect the devices in the facility telephone network.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a technique for an alarm panel to seize control of a landline in a facility network that includes an alarm signal processing device (e.g., a device that may process/relay information relating to an alarm signal provided by the alarm panel). In some implementations, the alarm signal processing device may disconnect devices in the facility network to make a landline in the facility network available for the alarm panel to place a telephone call that includes the alarm signal. For example, the alarm panel may provide the alarm signal as a dual-tone multi-frequency (DTMF) signal or some other type of signal. In some implementations, the alarm signal processing device may receive and process the alarm signal based on information included in the alarm signal.

For example, the alarm signal processing device may receive the alarm signal as a DTMF signal, and may provide an alarm message, relating to the DTMF signal to a recipient, such as an alarm response facility, an emergency dispatch facility, or the like. Additionally, or alternatively, the alarm signal processing device may perform some other task based on receiving the DTMF signal.

Figure 1:
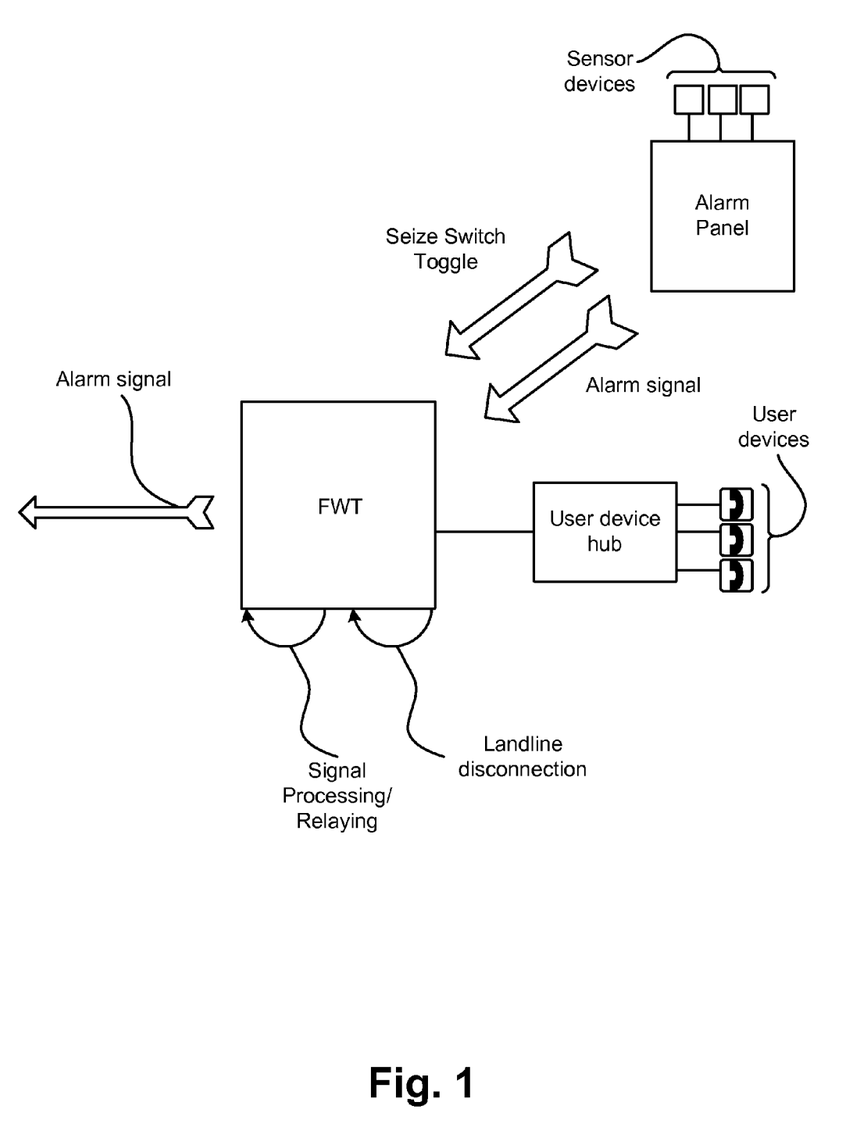
FIG. 1 illustrates an example overview of an implementation described herein.

FIG. 1 illustrates an example overview of an implementation described herein. As shown in FIG. 1, an alarm panel may toggle a seize switch based on receiving an electrical signal from a sensor device connected to the alarm panel. For example, the sensor device may provide the electrical signal when detecting the occurrence of an event (e.g., the opening of a door or window, a forced-entry intrusion, a sound of glass breaking, an intrusion of carbon monoxide, an intrusion of water, a fire, smoke, object motion, and/or some other type of event in or around a facility). In some implementations, the alarm panel may toggle the seize switch in order to place a telephone call to provide an alarm signal, such as a DTMF signal, that may include a series of tones/pauses that convey data relating to an alarm (e.g., a type of alarm, a location of the alarm, etc.). In some implementations, an alarm signal processing device (e.g., a fixed wireless terminal (FWT)) may identify that the seize switch has been toggled by the alarm panel and may disconnect user devices connected to the FWT via a landline in order to make the landline available for the alarm panel to place the telephone call.

In some implementations (e.g., based on disconnecting the user devices), the alarm panel may place the telephone call. In some implementations, the FWT may answer the telephone call, receive the alarm signal from the alarm panel, and process the alarm signal. For example, based on information included in the alarm signal, the FWT may relay the alarm signal to an alarm monitoring facility by placing a telephone call to the alarm monitoring facility and providing the alarm signal as a DTMF signal. Additionally, or alternatively, the FWT may translate the alarm signal from a DTMF signal to a packet-based message, and provide the alarm signal (e.g., as a packet-based message) to the alarm monitoring facility via a packet-based network (e.g., an internet protocol (IP) network, such as a cellular network, a fiber optic network, a wide area network (WAN), or the like). Additionally, or alternatively, the FWT may perform some other task based on receiving the alarm signal (e.g., establish a priority voice over IP (VoIP) call session for user devices while keeping the landline free for use by the alarm panel).

As described above, the alarm panel may seize control of the landline by toggling a seize switch. For example, the alarm panel may toggle the seize switch by going "off-hook," thereby causing the FWT to disconnect user devices connected to the landline and allowing the alarm panel to place a telephone call to provide an alarm signal. In some implementations, the FWT may receive the alarm signal and may process the alarm signal by relaying the alarm signal as a DTMF signal, translating the alarm signal to a packet-based message and providing the packet-based signal via a packet-based network, and/or performing some other task based on information included in the alarm signal. In some implementations, the FWT may be retrofitted into existing alarm systems that have alarm panels that toggle a seize switch in order to place a telephone call to provide an alarm signal.

Figure 2:
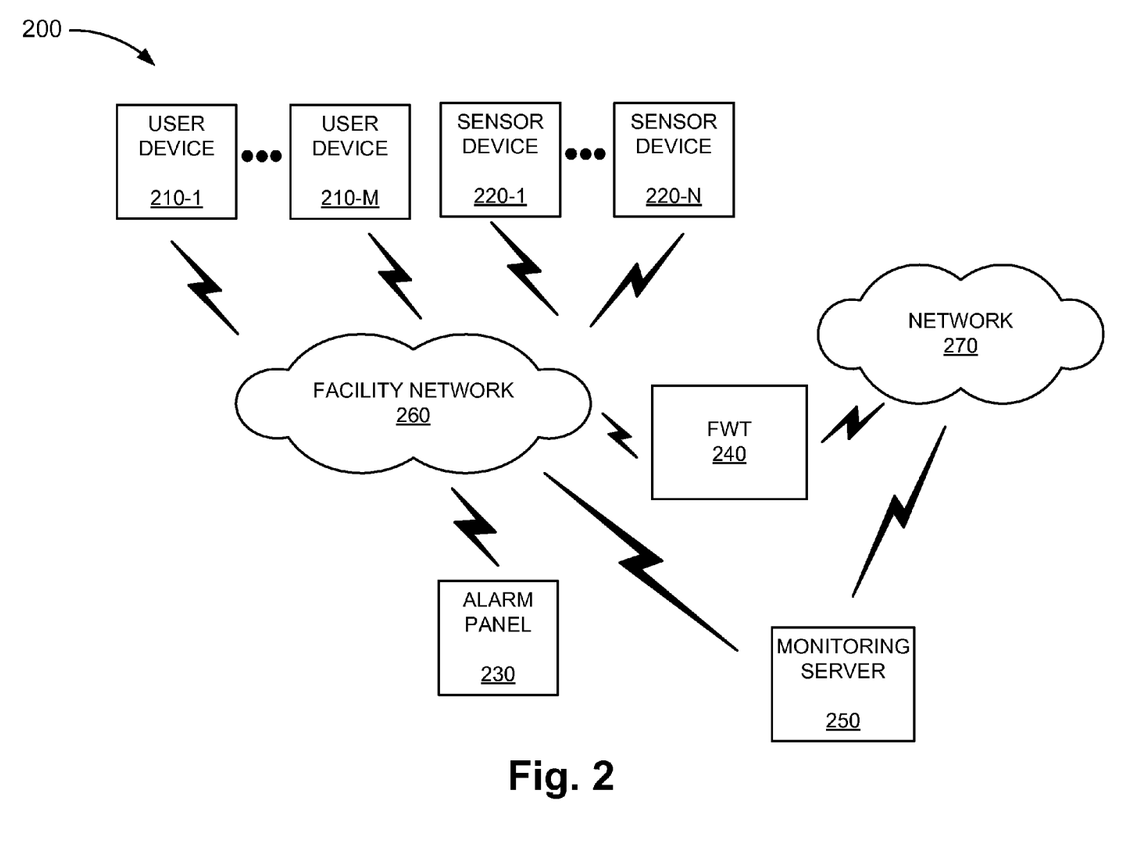
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), sensor devices 220-1, . . . , 220-N (where N≥1), alarm panel 230, FWT 240, monitoring server 250, facility network 260, and/or network 270.

User device 210 may include a device capable of communicating via a network, such as facility network 260 and/or network 270. For example, user device 210 may correspond to a landline telephone device, a mobile communication device (e.g., a smart phone or a personal digital assistant (PDA)), a computing device (e.g., a desktop, a laptop or a tablet computer), or another type of device. In some implementations, user device 210 may connect to landline telecommunications equipment within facility network 260 to place landline telephone calls. In some implementations, user device 210 may connect to an IP network within facility network 260 to place telephone calls over an IP network (e.g., via a VoIP session).

Sensor device 220 may include a device that detects an event, such as the opening of a door or window, object motion, forced-entry intrusion, glass breakage, intrusion of carbon monoxide, water, fire, smoke, and/or some other type of event in or around a facility. For example, sensor device 220 may include a motion detector, an air temperature sensor, a fluid temperature sensor (e.g., a water heater temperature sensor), a glass-break sensor, a door/window sensor, a switch, and/or some other type of sensor or group of sensors. In some implementations, sensor device 220 may report the occurrence of an event to alarm panel 230 based on detecting the occurrence of the event. For example, the occurrence of the event may cause a switch, associated with sensor device 220, to trip or close, thereby causing sensor device 220 to send an electrical signal to a particular terminal of alarm panel 230 connected to sensor device 220. Additionally, or alternatively, sensor device 220 may measure object motion, a level of smoke, water, carbon monoxide, etc., and may provide the electrical signal when the measurement exceeds or drops below a particular threshold. In some implementations, a facility may include one or more sensor devices 220 as part of a facility alarm and/or monitoring system.

Alarm panel 230 may include an electronic panel that receives an electrical signal, from sensor device 220, corresponding to an alarm (e.g., the occurrence of an event). In some implementations, alarm panel 230 may provide an alarm signal based on receiving the electrical signal via a particular terminal of alarm panel 230. In some implementations, alarm panel 230 may include a landline interface to provide the alarm signal by toggling a seize switch (corresponding to when alarm panel 230 goes "off-hook") to place a telephone call (e.g., using a dialer of alarm panel 230) and provide the alarm signal. In some implementations, alarm panel 230 may be located in the particular facility and may receive electrical signals from multiple sensor devices 220 located in or around the particular facility. For example, alarm panel 230 may include multiple terminals with each terminal connected to a particular sensor device 220. In some implementations, each terminal may include a particular identifier (ID) and may be associated with a particular sensor device 220, a particular alarm type, a particular location/zone, etc.

As described above, the alarm signal may be in the form of a DTMF signal and/or some other type of signal. In some implementations, the alarm signal may identify a particular facility (e.g., an account number associated with the particular facility), a type of the alarm signal, a location or zone of the alarm signal, and/or some other information relating to the alarm signal (e.g., based on a particular terminal via which the electrical signal is received).

FWT 240 may include a computing device, such as a server device, a desktop device, or some other type of alarm signal processing device. In some implementations, FWT 240 may include an RJ-31 interface to receive an alarm signal from alarm panel 230 (e.g., using an analog voice interface of FWT 240). In some implementations, FWT 240 may be implemented in a facility having an associated alarm system. Additionally, or alternatively, FWT 240 may be implemented in some other location. In some implementations, FWT 240 may connect to a seize switch implemented within alarm panel 230. In some implementations, FWT 240 may toggle a landline switch that connects user devices 210 to a landline connection of facility network 260 in order to disconnect user devices 210 from the landline connection, thereby allowing the landline connection to remain free for use by alarm panel 230.

In some implementations, FWT 240 may receive an alarm signal and may process the alarm signal based on information included in the alarm signal (e.g., a particular terminal via which an electrical signal, corresponding to the alarm signal, is received by alarm panel 230). In some implementations, FWT may convert the alarm signal to a packet-based message having some or all of the information of the alarm signal. For example, the packet-based message may identify a type of the alarm signal, a location or zone of the alarm signal, and/or some other information relating to the alarm signal. In some implementations, FWT 240 may provide the packet-based message to monitoring server 250.

In some implementations, FWT 240 may include a communications interface to communicate with network 270 in order to process an alarm signal. For example, FWT 240 may include a wired/wireless network interface component, a cellular antenna, and/or some other component to provide the alarm signal to monitoring server 250 and/or to facilitate communications associated with a VoIP session.

Monitoring server 250 may include a computing device, such as a server device, or a collection of server devices. In some implementations, monitoring server 250 may be located in an alarm monitoring station and may alert an operator that an alarm signal (e.g., a packet-based message identifying the alarm signal) has been received (e.g., to allow the operator to respond to the alarm signal). For example, monitoring server 250 may include an interface that can receive the packet-based message from network 270. Additionally, or alternatively, monitoring server 250 may receive an alarm signal in the form of a DTMF signal. For example, monitoring server 250 may answer a telephone call from alarm panel 230 and/or FWT 240 and may receive the DTMF signal via the telephone call from alarm panel 230 and/or FWT 240.

Facility network 260 may include one or more wired and/or wireless networks. For example, facility network 260 may include a sensor network connecting sensor devices 220 to alarm panel 230. Additionally, or alternatively, facility network 260 may include telecommunications equipment to connect user devices 210, alarm panel 230, and/or FWT 240 to network 270 via a landline connection. Additionally, or alternatively, facility network 260 may include a local area network (LAN), a wide area network (WAN), an ad hoc network, a managed IP network, a virtual private network (VPN), an intranet, a fiber optic-based network, and/or a combination of these or other types of networks.

Network 270 may include one or more wired and/or wireless networks. For example, network 270 may include a cellular network (e.g., a second generation (2G) network, a third generation (3G) network, a fourth generation (4G) network, a fifth generation (5G) network, a long-term evolution (LTE) network, a code-division multiple access (CDMA) network, a global system for mobile (GSM) network, evolution-data optimized (EVDO) network, or the like), a public land mobile network (PLMN), and/or another network. Additionally, or alternatively, network 270 may include a LAN, a WAN, a metropolitan network (MAN), a telephone network (e.g., the Public Switched Telephone Network (PSTN)), an ad hoc network, a managed IP network, a VPN, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
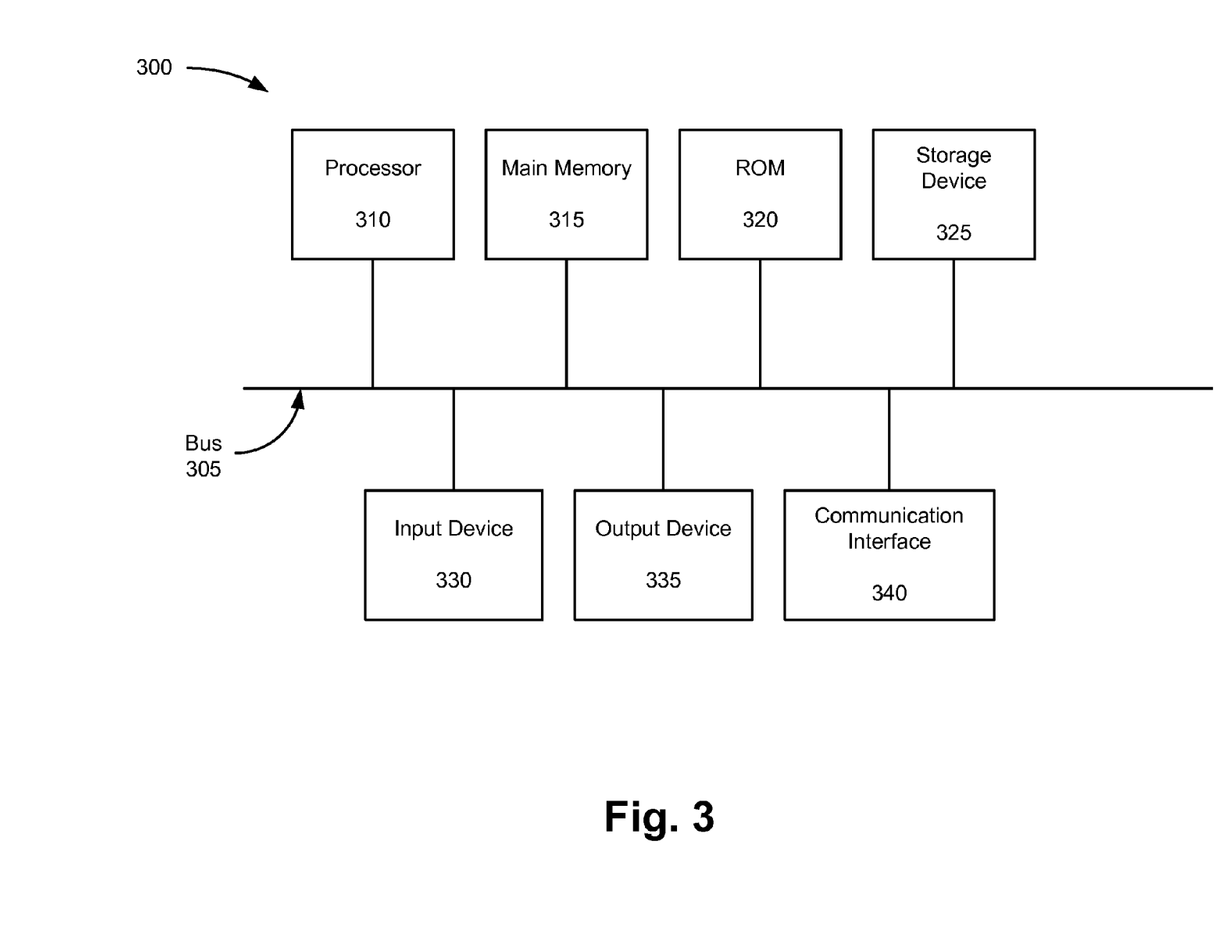
FIG. 3 illustrates example components of a device that may be used within the environment of FIG. 2.

FIG. 3 illustrates example components of a device 300 that may be used within environment 200 of FIG. 2. Device 300 may correspond to user device 210, sensor device 220, alarm panel 230, FWT 240, and/or monitoring server 250. Each of user device 210, sensor device 220, alarm panel 230, FWT 240, and/or monitoring server 250 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
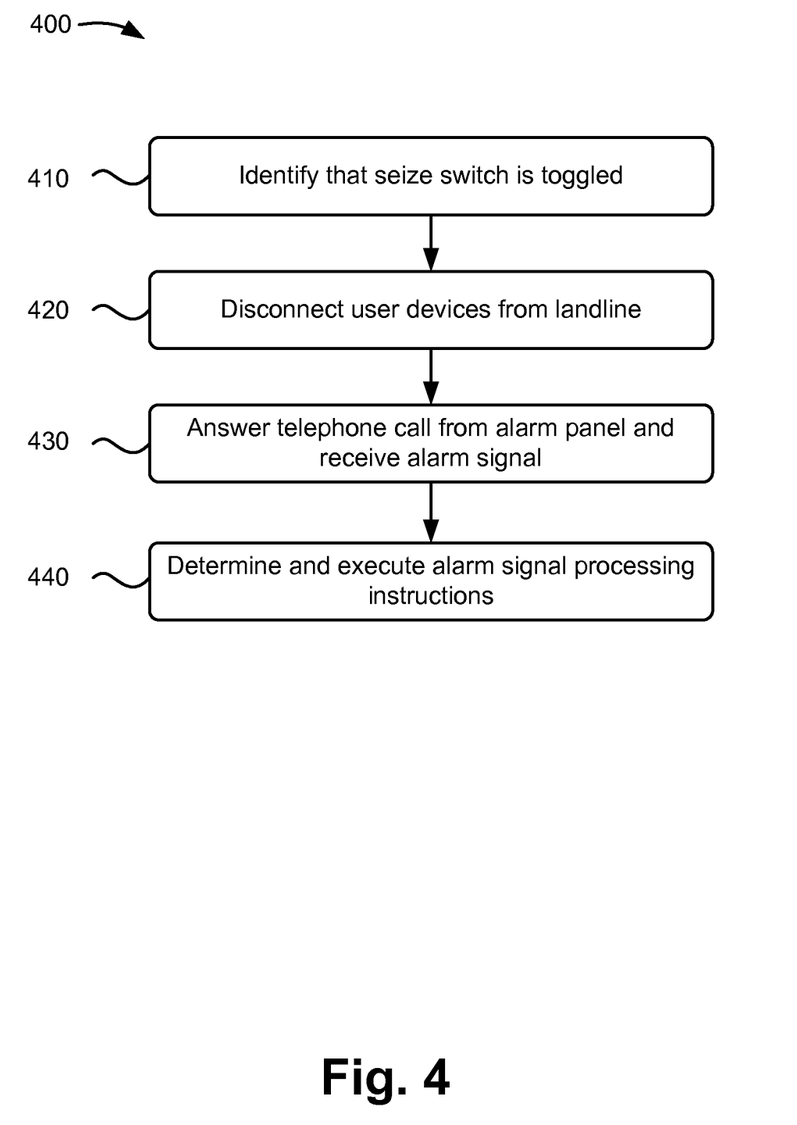
FIG. 4 illustrates a flowchart of an example process for receiving an alarm signal and executing an alarm signal processing instruction.

FIG. 4 illustrates a flowchart of an example process 400 for receiving an alarm signal and executing an alarm signal processing instruction. In one implementation, process 400 may be performed by one or more components of FWT 240. In another implementation, some or all of blocks of process 400 may be performed by one or more components of another device in environment 200 (e.g., user device 210 and/or alarm panel 230), or a group of devices including or excluding FWT 240.

As shown in FIG. 4, process 400 may include identifying that a seize switch has been toggled (block 410). For example, FWT 240 may identify that the seize switch has been toggled based on identifying a change in voltage associated with a connection between alarm panel 230 and FWT 240. As described above, alarm panel 230 may toggle the seize switch in order to connect to a landline of facility network 260 and to place a telephone call to provide an alarm signal (e.g., based on receiving an electrical signal from sensor device 220 that indicates the occurrence of an event corresponding to the alarm signal).

Process 400 may also include disconnecting user devices from the landline (block 420). For example, FWT 240 may toggle a switch connecting user devices 210 to the landline, based on identifying that the seize switch has been toggled by alarm panel 230, to disconnect user devices 210 from the landline. In some implementations, block 420 may be omitted when FWT 240 does not include the switch connecting user devices 210 to the landline. For example, as described in greater detail below, the seize switch, implemented within alarm panel 230, may function as a single seize switch that may connect alarm panel 230 to the landline and disconnect user devices 210 from the landline.

In some implementations, alarm panel 230 may receive a dial-tone when user devices 210 have been disconnected from the landline, thereby allowing alarm panel 230 to place a telephone call to provide an alarm signal.

Process 400 may further include answering the telephone call from the alarm panel and receiving an alarm signal (block 430). For example, FWT 240 may answer the call, placed by alarm panel 230, and may provide a synchronization signal to alarm panel 230 based on answering the call. In some implementations, the synchronization signal may include a digital signal 1 (DS1) extended super frame (ESF) signal corresponding to a sequence of 1's and 0's to synchronize reference clocks of alarm panel 230 and FWT 240. In some implementations, the synchronization signal may direct alarm panel 230 to provide the alarm signal to FWT 240. In some implementations, the synchronization signal may correspond to a tone-based handshake between FWT 240 and alarm panel 230.

In some implementations, FWT 240 may receive the alarm signal as a DTMF type signal or some other type of analog signal. For example, alarm panel 230 may send the alarm signal by dialing a series of digits using a dialer (e.g., containing a set of hard or soft buttons having numeric or alphanumeric characters) of alarm panel 230. In some implementations, the alarm signal may include a series of audible tones and/or pauses corresponding to the series of digits dialed by alarm panel 230. In some implementations, a tone may include a pulse and/or a series of pulse-dialed digits. In some implementations, FWT 240 may use an analog voice interface to receive the alarm signal and the associated series of audible tones and/or pauses. In some implementations, FWT 240 may interpret a tone based on a frequency of the tone, based on a dial plan associated with FWT 240, and/or based on some other information. For example, FWT 240 may use a DC9 protocol, a contact ID protocol, and/or some other type of protocol to interpret the tone.

In some implementations, FWT 240 may identify a set of digits from the series of tones associated with the alarm signal (e.g., a particular tone may correspond to a particular digit). Additionally, FWT 240 may identify another set of digits based on a pause followed by another series of tones. In some implementations, one or more sets of digits may identify alarm related information, such as a type of the alarm signal, a location or zone of the alarm signal, an account number associated with the alarm signal (e.g., to identify a particular facility associated with the alarm signal), and/or some other information associated with the alarm signal. In some implementations, the alarm related information may be based on a particular terminal via which an electrical signal is received from sensor device 220 (e.g., an electrical signal corresponding to an alarm).

As an example, the alarm signal may include a first set of digits to identify a particular terminal via which the electrical signal is received (e.g., the digits 001 may identify that the electrical signal is received via terminal number 001). The alarm signal may include a second set of digits to identify an account number (e.g., the digits 00001 to identify the account number 00001). In some implementations, the terminal number and the account number may correspond to a location of a facility associated with the alarm signal, a type of alarm (e.g., a fire alarm, an intrusion alarm, etc.), a zone associated with the alarm, etc.

In some implementations, FWT 240 may provide a sign-off signal to alarm panel 230 when FWT 240 receives an entire portion of the alarm signal. In some implementations, FWT 240 may determine that the entire portion of the alarm signal has been received based on an audio pattern of the alarm signal. For example, the FWT 240 may determine that the entire portion of the alarm signal has been received when an audible tone has not been received from alarm panel 230 for a predetermined period of time (e.g., 5 seconds, 10 seconds, or some other period of time). In some implementations, the predetermined period of time may be selected to allow for pauses in the alarm signal to be interpreted. Additionally, or alternatively, FWT 240 may determine that the entire portion of the alarm signal has been received based on receiving a predetermined pattern of a series of audible tones having been received from alarm panel 230. For example, alarm panel 230 may be programmed to provide the predetermined pattern of the series of audible tones to indicate the end of the alarm signal. In some implementations, FWT 240 may include an instruction that identifies the predetermined pattern of the series of the audible tones to allow FWT 240 to determine that the entire portion of the alarm signal has been received when the predetermined pattern of the series of the audible tones has been received.

In some implementations, the sign-off signal may include an audible burst of noise (e.g., a sound having a predetermined tone, frequency, and/or volume) that alarm panel 230 may interpret to terminate the call used to provide the alarm signal and/or the associated tones (e.g., to prevent FWT 240 from receiving additional noise and/or tones that may corrupt the alarm signal). In some implementations, alarm panel 230 may retry sending the alarm signal until alarm panel 230 receives the sign-off signal. In some implementations, alarm panel 230 may place a call to another telephone number or perform some other action when alarm panel 230 does not receive the sign-off signal within a predetermined period of time of sending the alarm signal. In some implementations, the predetermined period of time may be selected to allow alarm panel 230 to receive the sign-off signal (e.g., if the transmission sign-off signal were to be delayed by FWT 240).

Process 400 may also include determining and executing alarm signal processing instructions (block 440). For example, FWT 240 may store a processing instruction for the alarm signal based on the type of alarm, a particular terminal via which an electrical signal is received by alarm panel 230, a particular telephone number dialed by alarm panel 230 to provide the alarm signal, information identifying an account associated with the alarm signal, and/or other information relating to the alarm signal (e.g., based on the set of digits, associated with the alarm signal, identified by FWT 240).

Figure 5:
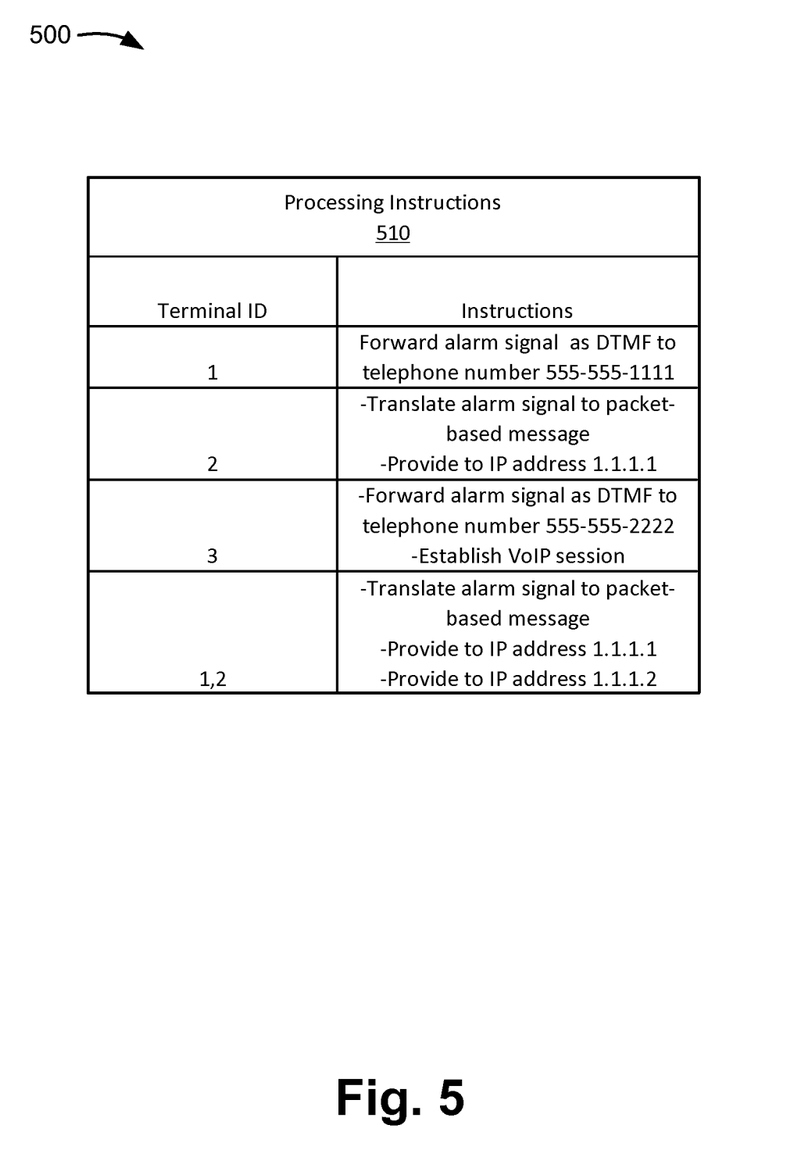
FIG. 5 illustrates an example data structure that may be stored by one or more devices in the environment of FIG. 2.

As an example, as further described in relation to FIG. 5, FWT 240 may determine a first alarm signal processing instruction when the alarm signal identifies that alarm panel 230 receives an electrical signal via a first terminal. FWT 240 may determine a second alarm signal processing instruction when the alarm signal identifies that alarm panel 230 receives an electrical signal via a second terminal.

In some implementations, the alarm signal processing instruction may direct FWT 240 to translate the alarm signal from a DTMF signal to a packet-based message and provide the packet-based message to monitoring server 250 and/or user device 210 via an IP based network or via another type of network (e.g., as a short message service (SMS) text, an e-mail message, or the like). For example, FWT 240 may identify a series of digits from the DTMF signal (e.g., as described above with respect to process block 430), may generate a packet-based message, and may store the series of digits in the packet-based message to form a packet-based message having information relating to the alarm signal.

Additionally, or alternatively, the alarm signal processing instruction may direct FWT 240 to establish an IP session for user device 210 (e.g., a VoIP session) to allow user device 210 to communicate with network 270 while keeping the landline free for use by alarm panel 230. Additionally, or alternatively, the alarm signal processing instruction may direct FWT 240 to forward the alarm signal as a DTMF signal to monitoring server 250 via a landline. Additionally, or alternatively, the alarm signal processing instruction may direct FWT 240 to perform some other function based on information relating to the alarm (e.g., corresponding to the set of digits, associated with the alarm signal, identified by FWT 240).

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

FIG. 5 illustrates an example data structure 500 that may be stored by one or more devices in environment 200, such as FWT 240. In some implementations, data structure 500 may be stored in a memory of FWT 240. In some implementations, data structure 500 may be stored in a memory separate from, but accessible by, FWT 240. In some implementations, data structure 500 may be stored by some other device in environment 200, such as user device 210, alarm panel 230, and/or monitoring server 250.

A particular instance of data structure 500 may contain different information and/or fields than another instance of data structure 500. In some implementations, data structure 500 may correspond to information associated with alarm signal processing instructions for a particular facility, or a particular FWT 240 associated with a particular alarm panel 230 implemented in a particular facility.

As shown in FIG. 5, data structure 500 may include processing instructions field 510.

Processing instructions field 510 may include information identifying one or more alarm processing instructions that FWT 240 may execute based on, for example, a terminal via which alarm panel 230 receives an electrical signal from sensor device 220 (e.g., an electrical signal corresponding to an alarm). For example, as described above, FWT 240 may identify the terminal based on information included in an alarm signal, such as a DTMF signal, received from alarm panel 230 (e.g., a particular digit in the DTMF signal that identifies the terminal).

As an example, processing instructions field 510 may store an alarm processing instruction to direct FWT 240 to provide the alarm signal as a DTMF signal to telephone number 555-555-1111 when FWT 240 receives an alarm instruction associated with terminal ID 1.

As another example, processing instructions field 510 may store an alarm processing instruction to direct FWT 240 to provide the alarm signal as a DTMF signal to telephone number 555-555-2222 when FWT 240 receives an alarm instruction associated with terminal ID 2. Additionally, the alarm processing instruction may direct FWT 240 to establish a VoIP session such that user devices 210 may communicate via the VoIP session while keeping the landline free for use by alarm panel 230.

In some implementations, processing instructions field 510 may store an alarm processing instruction when FWT 240 receives an alarm signal associated with multiple terminals of alarm panel 230. As an example, processing instructions field 510 may store an alarm processing instruction to direct FWT 240 to translate the alarm signal from a DTMF signal to a packet-based message, and provide the packet-based message via IP addresses 1.1.1.1 and 1.1.1.2 when the alarm signal is associated with terminal ID 1 and terminal ID 2.

In some implementations, processing instructions field 510 may store an alarm processing instruction to direct FWT 240 to perform some other task based on some other information relating to the alarm signal, in addition to, or alternatively to, the terminal ID (e.g., a telephone number that alarm panel 230 dials when providing the alarm signal, an account number associated with the alarm signal, an address of a facility associated with the alarm signal, etc.).

While particular fields are shown in a particular format in data structure 500, in practice, data structure 500 may include additional fields, fewer fields, different fields, or differently arranged fields than are shown in FIG. 5. Also, FIG. 5 illustrates examples of information stored by data structure 500. In practice, other examples of information stored by data structure 500 are possible.

In some implementations, information stored by data structure 500 may be modified via a user interface of FWT 240. For example, FWT 240 may include an application that may be accessible via user device 210. In some implementations, user device 210 may access FWT 240 via the application to provide processing instructions for particular terminals associated with alarm panel 230. In some implementations, the processing instructions may be selected to optimize alarm response for a particular facility in which alarm panel 230 and FWT 240 are implemented.

Figure 6A:
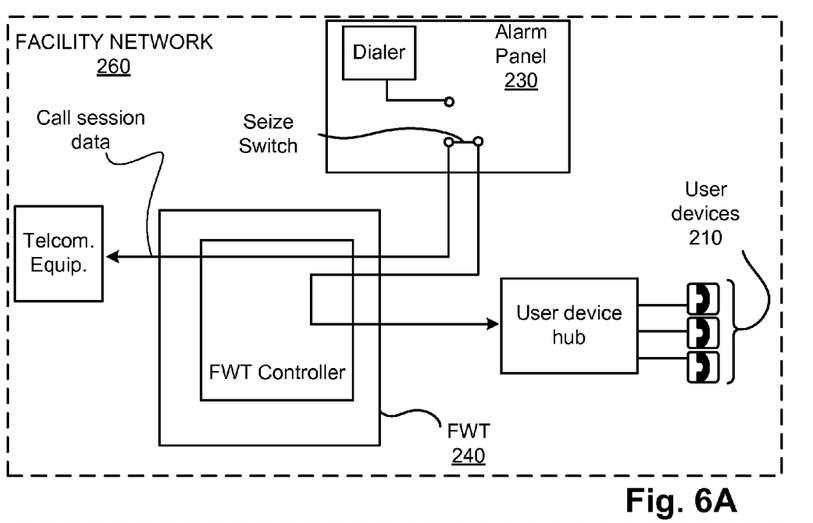
FIGS. 6A-6E illustrate example implementations as described herein.

FIGS. 6A-6E illustrate example implementations as described herein. In FIG. 6A, assume that alarm panel 230 has not received an electrical signal from sensor device 220 corresponding to an alarm. That is, assume that a landline, associated with facility network 260, is not in use by alarm panel 230.

As shown in FIG. 6A, facility network 260 may include telecommunications equipment to connect user devices 210 (e.g., via a user device hub) to a landline. As further shown in FIG. 6A, user devices 210 may connect to the telecommunications equipment via seize switch provided within alarm panel 230 and via a controller of FWT 240 (e.g., an FWT controller). That is, user devices 210 may connect to the landline (e.g., via the telecommunications equipment) in order to place telephone calls and to transmit/receive data relating to call session(s).

Figure 6B:
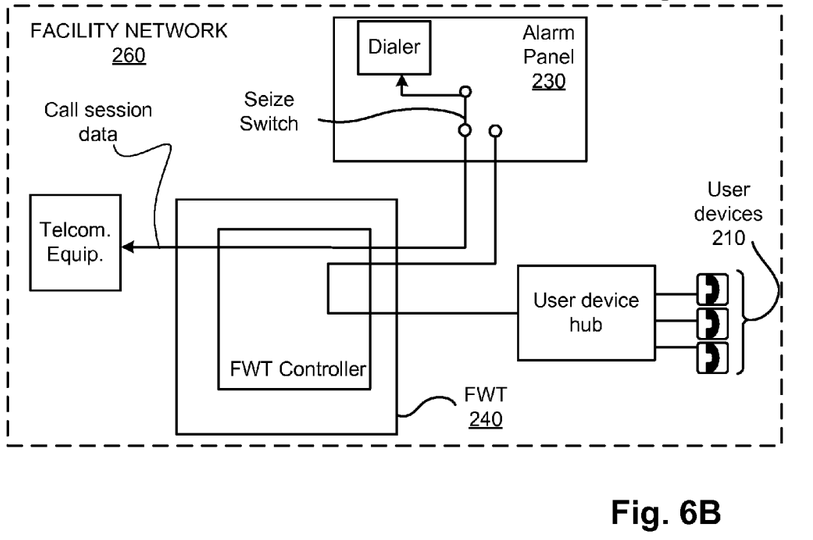

Referring to FIG. 6B, alarm panel 230 may seize control of the landline to disconnect user devices 210 from the landline (e.g., by disconnecting user devices 210 from the telecommunications equipment). For example, alarm panel 230 may toggle a seize switch connecting a dialer of alarm panel 230 to the telecommunications equipment (e.g., by going "off hook" in order to place a telephone call to provide an alarm signal). As shown in FIG. 6B, user devices 210 may disconnect from the telecommunications equipment (and hence, the landline) when alarm panel 230 toggles the seize switch. As a result, the landline may be made available for alarm panel 230 to place the telephone call having the alarm signal (e.g., using the dialer of alarm panel 230). In some implementations, the FWT controller may identify that alarm panel 230 has toggled the seize switch based on a voltage between the connection of the FWT controller and alarm panel 230. For example, FWT 240 may identify that alarm panel 230 has toggled the seize switch when the voltage between the connection of the FWT controller and alarm panel 230 changes.

Figure 6C:
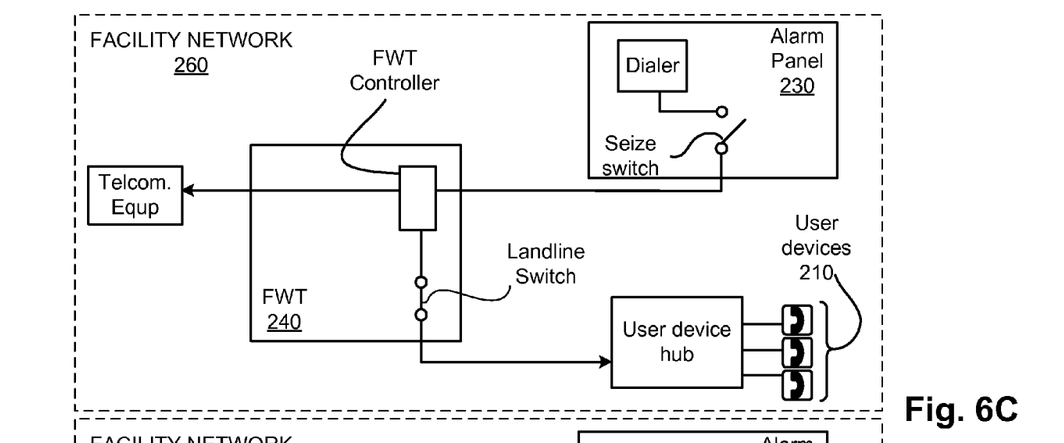

Referring to FIG. 6C, the FWT controller may connect with a landline switch to connect and/or disconnect user devices 210 from the telecommunications equipment (and hence the landline). For example, the FWT controller may toggle the landline switch based on position of the seize switch associated with alarm panel 230. For example, as shown in FIG. 6C, the FWT controller may toggle the landline switch when the seize switch is toggled (e.g., when the dialer of alarm panel 230 is disconnected from the landline).

Figure 6D:
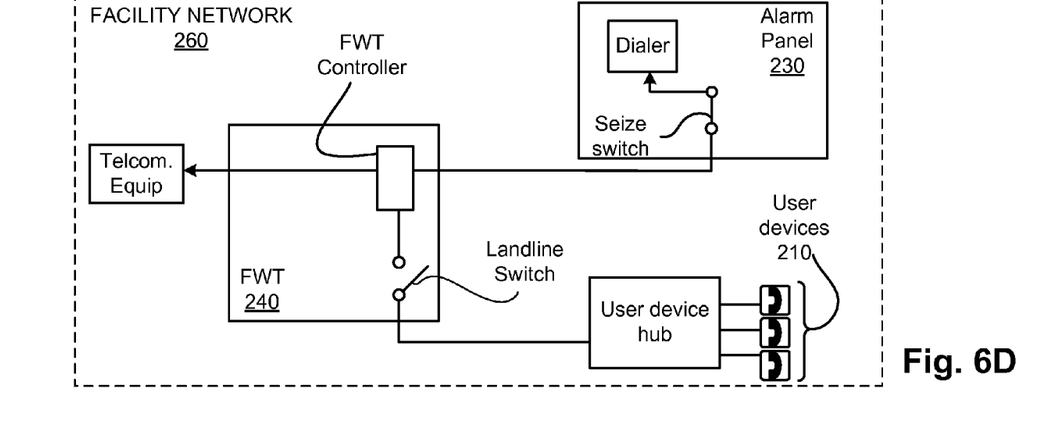

Referring to FIG. 6D, the FWT controller may toggle the landline switch when the seize switch is toggled (e.g., when the dialer of alarm panel 230 goes "off-hook" to connect to the landline network to place a telephone call and provide an alarm signal).

Figure 6E:
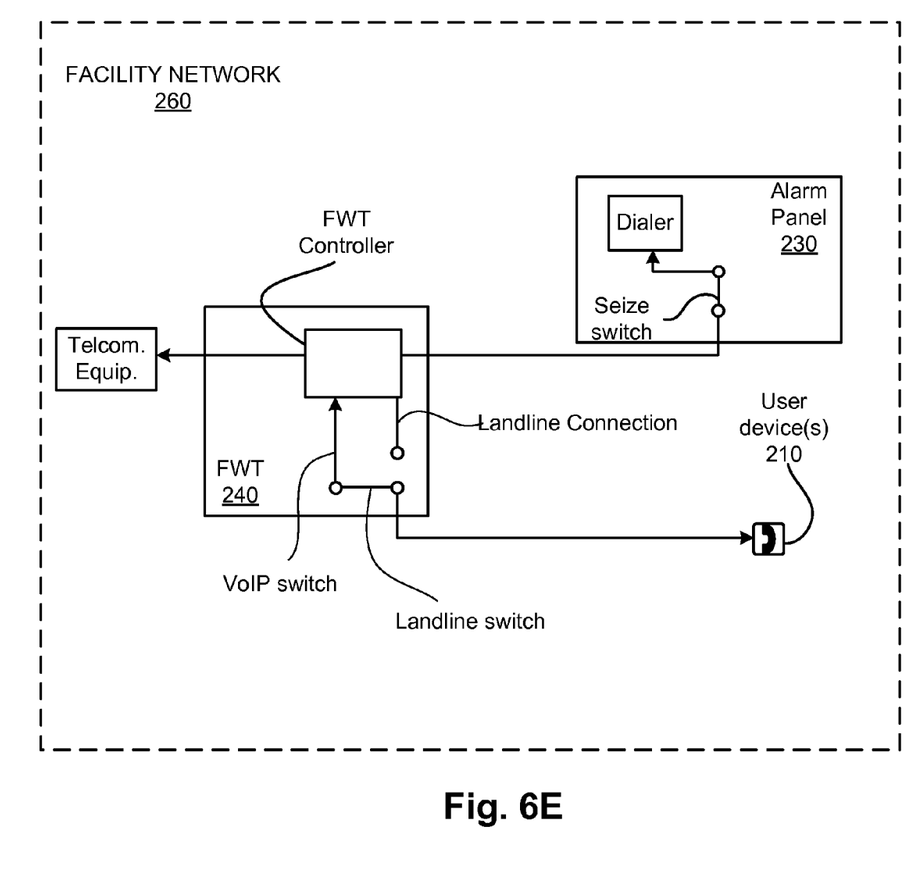

Referring to FIG. 6E, the FWT controller may toggle the landline switch and toggle a VoIP switch when the seize switch is toggled. In some implementations, FWT controller may toggle the VoIP switch when an alarm signal processing instruction directs FWT 240 to establish a VoIP session for user device 210, thereby allowing user device 210 to communicate via the VoIP session while keeping the landline free for use by alarm panel 230.

In some implementations, the FWT controller may identify that alarm panel 230 has toggled the seize switch based on the voltage associated with a connection between the FWT controller and alarm panel 230. In some implementations, the FWT controller may include a serial line switch and/or some other type of switch to toggle the landline switch.

While particular examples are shown in FIGS. 6A-6E, the above descriptions are merely example implementations. In practice, other examples are possible from what is described above in FIGS. 6A-6E.

Figure 7A:
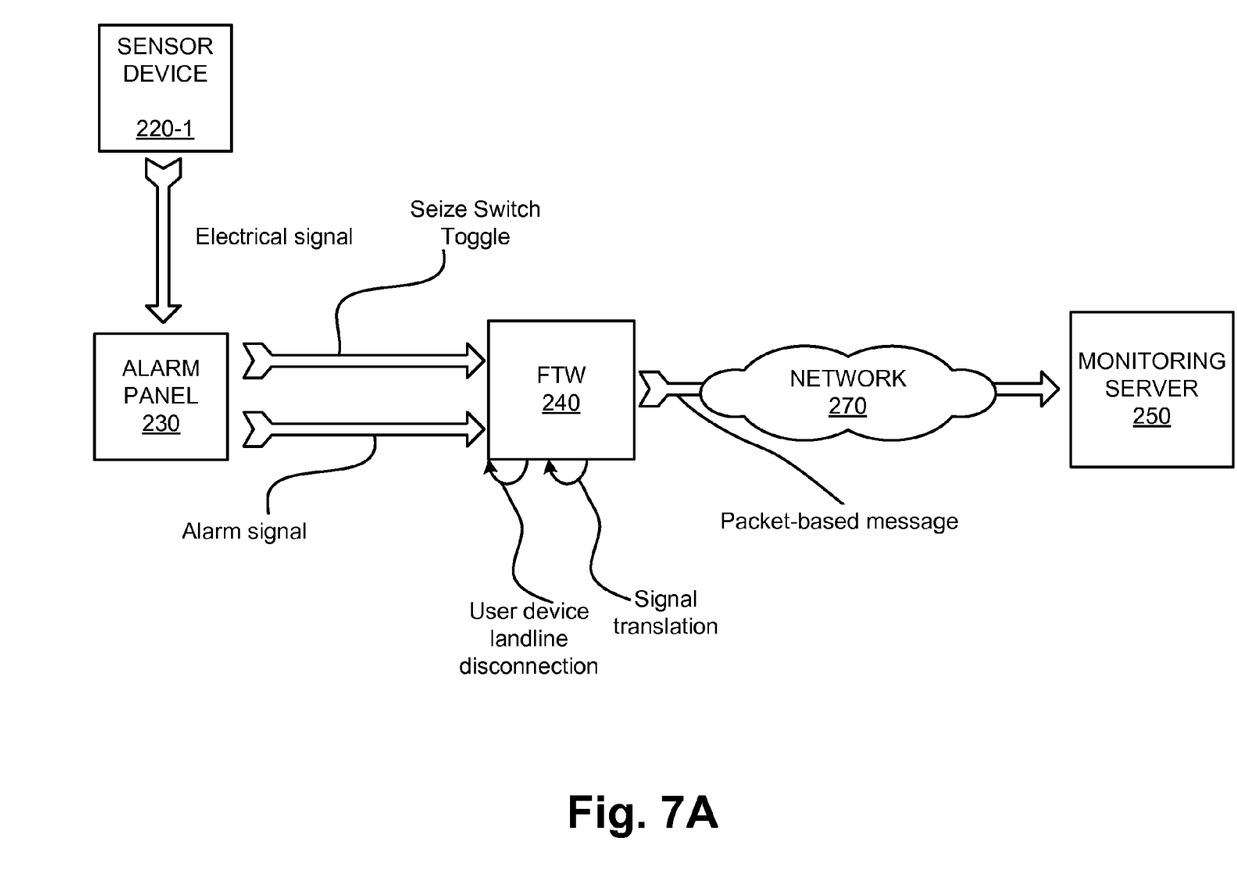
FIGS. 7A-7B illustrate example implementations as described herein.
Figure 7B:
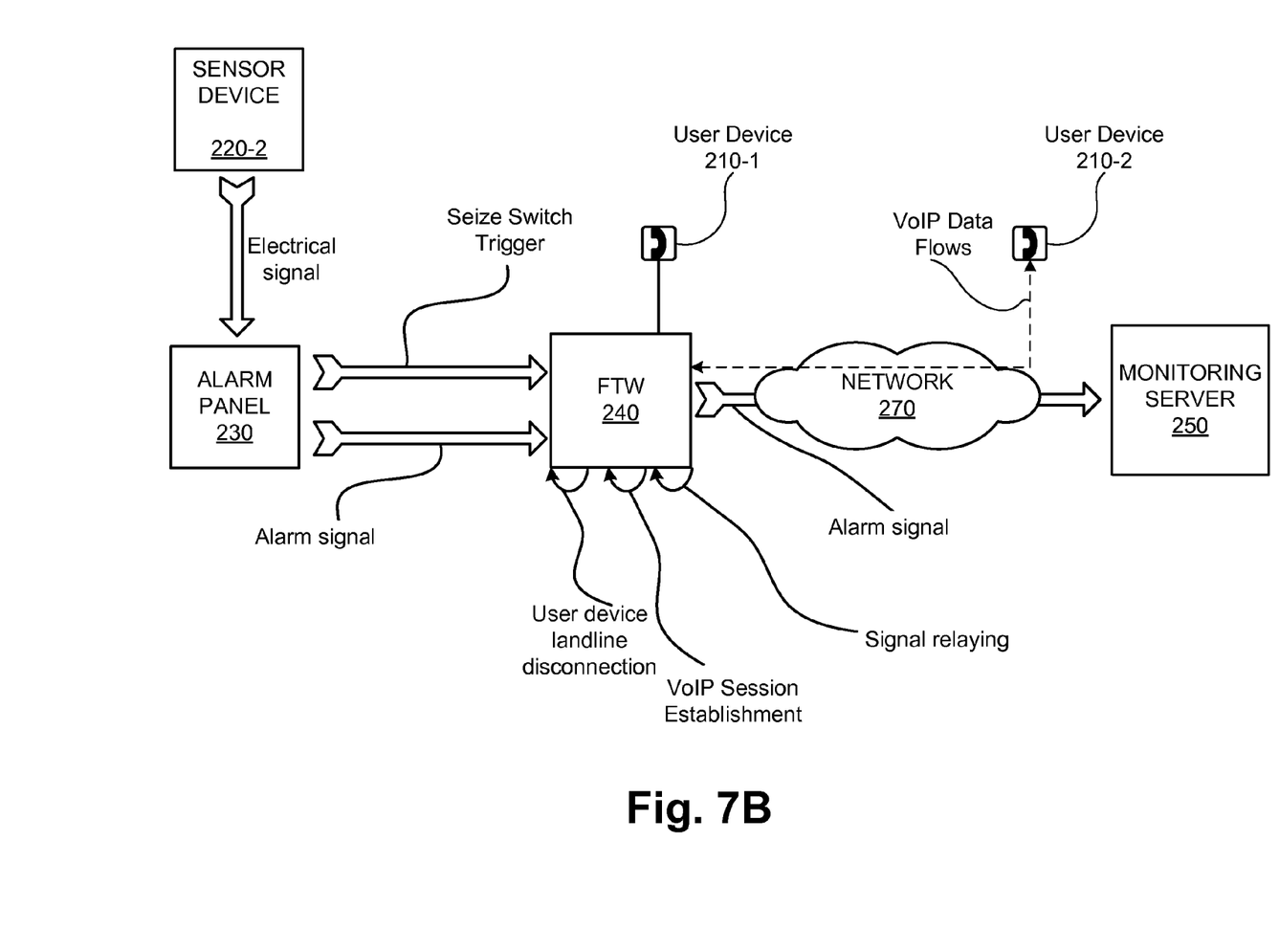

FIGS. 7A-7B illustrate example implementations as described herein. In FIG. 7A, assume that a first sensor device (e.g., sensor device 220-1) detects the occurrence of an event relating to an alarm (e.g., when a switch trips and/or when a sensor measurement exceeds or falls below a particular threshold). Given this assumption, sensor device 220-1 may provide an electrical signal to alarm panel 230 corresponding to the alarm. Based on receiving the electrical signal, alarm panel 230 may toggle a seize switch within alarm panel 230 to seize control of a landline within facility network 260 and place a telephone call to provide an alarm signal. For example, FWT 240 may disconnect user devices 210 from the landline by toggling off a landline switch connecting user devices 210 to the landline via telecommunications equipment of facility network 260, thereby making the landline available for use by alarm panel 230.

In some implementations, alarm panel 230 may provide the alarm message as a DTMF signal to FWT 240 (e.g., in accordance with process 400 described above). In FIG. 7A, assume that the alarm message includes information identifying a particular terminal via which alarm panel 230 receives the electrical signal. Further, assume that FWT 240 stores an alarm processing instruction to direct FWT 240 to translate the DTMF signal to a packet-based message when FWT 240 receives an alarm signal associated with the particular terminal. Given these assumptions, FWT 240 may translate the alarm signal to a packet-based message, and provide the packet-based message to monitoring server 250 via an IP network.

Referring to FIG. 7B, assume that at a later time, a second sensor device (e.g., sensor device 220-2) detects the occurrence of an event relating to an alarm and that sensor device 220-2 provides an electrical signal to alarm panel 230 corresponding to the alarm. Based on receiving the electrical signal, alarm panel 230 may toggle the seize switch within alarm panel 230 to seize control of a landline within facility network 260 and place a telephone call to provide an alarm signal (e.g., as a DTMF signal).

In FIG. 7B, assume that the alarm message includes information identifying a particular terminal via which alarm panel 230 receives the electrical signal. Further, assume that FWT 240 stores an alarm processing instruction associated with the particular terminal. For example, assume that the alarm processing instruction directs FWT 240 to provide the alarm signal as a DTMF signal to monitoring server 250 (e.g., by placing a telephone call to monitoring server 250 and relaying the alarm signal received from alarm panel 230 as a DTMF signal). Further, assume that the alarm processing instruction directs FWT 240 to establish a VoIP session for user device 210-1. Given these assumptions, FWT 240 may provide the alarm signal as a DTMF signal to monitoring server 250 and may toggle a switch to connect user device 210-1 to a VoIP connection corresponding to the VoIP session. Further, FWT 240 may facilitate data flows, associated with the VoIP session, between user device 210-1 and user device 210-2.

While particular examples are shown in FIGS. 7A-7B, the above descriptions are merely example implementations. In practice, other examples are possible from what is described above in FIGS. 7A-7B.

As described above, alarm panel 230 may seize control of a landline in facility network 260 by toggling a seize switch. For example, alarm panel 230 may toggle the seize switch by going "off-hook," thereby causing FWT 240 to disconnect user devices 210 connected to the landline and allowing alarm panel 230 to place a telephone call to provide an alarm signal. In some implementations, FWT 240 may receive the alarm signal and may process the alarm signal by relaying the alarm signal as a DTMF signal, translating the alarm signal to a packet-based message and providing the packet-based message via a packet-based network, and/or performing some other task based on information included in the alarm signal. In some implementations, FWT 240 may be retrofitted into existing alarm systems that have alarm panels 230 that toggle a seize switch in order to place a telephone call to provide an alarm signal.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
 identifying, by a device, that a switch has been toggled by an alarm panel device,
  the switch being toggled causing a user device to be disconnected from a landline;
 receiving, by the device, an alarm signal from the alarm panel device via the landline based on the switch being toggled;
 determining, by the device, a particular processing instruction, of one or more processing instructions, based on information included in the alarm signal,
  the particular processing instruction directing the device to establish a communication session between the user device and an external device, without the landline, and to send the alarm signal via the landline; and
 executing, by the device, the particular processing instruction to:
  provide the alarm signal to a server device via the landline,
  establish the communication session while the landline is available to provide the alarm signal, and
  connect the user device to the external device via the communication session without the landline.

2. The method of claim 1, further comprising:
 disconnecting the user device from the landline based on identifying that the switch has been toggled by the alarm panel device, where receiving the alarm signal occurs after disconnection of the user device from the landline.

3. The method of claim 2, where the user device is disconnected from a network when the switch has been toggled by the alarm panel device to make the network available for use by the alarm panel device to provide the alarm signal.

4. The method of claim 1, where the alarm signal is a dual-tone multi-frequency (DTMF) signal, and where the particular processing instruction directs the device to provide the alarm signal to the server device as a DTMF signal, the method further comprising:
  placing a telephone call to the server device and providing the alarm signal via the telephone call,
    where executing the particular processing instruction includes placing the telephone call to the server device and providing the alarm signal via the telephone call.

5. The method of claim 1, further comprising:
  receiving another alarm signal from the alarm panel via the landline;
  determining another processing instruction, of the one or more processing instructions, based on information included in the other alarm signal,
    the other processing instruction directing the device to translate the other alarm signal to a packet-based message;
  translating the other alarm signal to the packet-based message based on the other processing instruction; and
  providing the packet-based message to the server device.

6. The method of claim 1, where the communication session is a voice over internet protocol (VoIP) session, the method further comprising:
  transmitting or receiving a data flow towards or from the user device via the VoIP session.

7. The method of claim 1, where the information included in the alarm signal identifies a particular terminal via which the alarm panel device receives an electrical signal corresponding to an occurrence of an event,
  where determining the particular processing instruction is based on the particular terminal,
  the one or more processing instructions being different for different terminals from which the alarm signal is able to be received.

8. The method of claim 1, where the information included in the alarm signal identifies a particular telephone number dialed by the alarm panel device to provide the alarm signal,
  where determining the particular processing instruction is based on the telephone number dialed by the alarm panel device,
  the one or more processing instructions being different for different telephone numbers dialed by the alarm panel device.

9. A device comprising:
  one or more processors to:
    identify that a switch has been toggled by an alarm panel device;
    disconnect one or more user devices from a landline based on identifying that the switch has been toggled by the alarm panel device;
    receive an alarm signal from the alarm panel device via the landline after disconnecting the one or more user devices from the landline;
    determine a particular processing instruction, of one or more processing instructions, based on information included in the alarm signal,
      the particular processing instruction directing the device to establish a communication session between a user device, of the one or more user devices, and an external device, independent of the landline, and to send the alarm signal via the landline; and
    execute the particular processing instruction to:
      provide the alarm signal to a server device via the landline,
      establish the communication session while the landline is available to provide the alarm signal, and
      connect the user device to the external device via the communication session independent of the landline.

10. The device of claim 9, where the one or more processors are further to:
  provide a synchronization signal to the alarm panel device based on identifying that the switch has been toggled,
    the synchronization signal directing the alarm panel device to provide the alarm signal,
  where when receiving the alarm signal, the one or more processors are to receive the alarm signal based on providing the synchronization signal.

11. The device of claim 9, where the alarm signal is a dual-tone multi-frequency (DTMF) signal, and where the particular processing instruction directs the device to provide the alarm signal to the server device as a DTMF signal,
  where the one or more processors are further to:
    place a telephone call to the server device and provide the alarm signal via the telephone call,
    where when executing the particular processing instruction, the one or more processors are to place the telephone call to the server device and provide the alarm signal via the telephone call.

12. The device of claim 9, where the one or more processors are further to:
  receive another alarm signal from the alarm panel via the landline;
  determine another processing instruction, of the one or more processing instructions, based on information included in the other alarm signal,
    the other processing instruction directing the device to translate the other alarm signal to a packet-based message,
  translate the other alarm signal to the packet-based message based on the other processing instruction; and
  provide the packet-based message to the server device.

13. The device of claim 9, where the communication session is a voice over internet protocol (VoIP) session,
  where the one or more processors are further to:
    transmit or receive a data flow towards or from the one or more user devices via the VoIP session.

14. The device of claim 9, where the information included in the alarm signal identifies a particular terminal via which the alarm panel device receives an electrical signal corresponding to an occurrence of an event,
  where when determining the particular processing instruction, the one or more processors are to determine the particular processing instruction based on the particular terminal,
  the one or more processing instructions being different for different terminals from which the alarm signal is able to be received.

15. A non-transitory computer-readable medium for storing instructions, the instructions comprising:
  a plurality of instructions which, when executed by one or more processors associated with a device, cause the one or more processors to:

identify that a switch has been toggled by an alarm panel device,
    the alarm panel device toggling the switch on based on receiving an electrical signal corresponding to an alarm;
disconnect a user device from a landline based on identifying that the switch has been toggled by the alarm panel device;
receive an alarm signal from the alarm panel device via the landline after disconnecting the user device from the landline;
determine a particular processing instruction, of one or more processing instructions, based on information included in the alarm signal,
    the particular processing instruction directing the device to establish a communication session between the user device and an external device, independent of the landline, and to send the alarm signal via the landline; and
execute the particular processing instruction to:
    provide the alarm signal to a monitoring device via the landline,
    establish the communication session while the landline is available to provide the alarm signal, and
    connect the user device to the external device via the communication session independent of the landline.

16. The non-transitory computer-readable medium of claim 15, where the plurality of instructions further cause the one or more processors to:
provide a synchronization signal to the alarm panel device based on identifying that the switch has been toggled,
    the synchronization signal directing the alarm panel device to provide the alarm signal,
where one or more instructions, of the plurality of instructions, to receive the alarm signal, cause the one or more processors to receive the alarm signal based on providing the synchronization signal.

17. The non-transitory computer-readable medium of claim 15, where the alarm signal is a dual-tone multi-frequency (DTMF) signal, and
where the particular processing instruction directs the device to provide the alarm signal to the monitoring device as a DTMF signal,
where the plurality of instructions further cause the one or more processors to:
    place a telephone call to the monitoring device and provide the alarm signal via the telephone call,
    where one or more instructions, of the plurality of instructions, to execute the particular processing instruction, cause the one or more processors to place the telephone call to the monitoring device and provide the alarm signal via the telephone call.

18. The non-transitory computer-readable medium of claim 15, where the plurality of instructions further cause the one or more processors to:
receive another alarm signal from the alarm panel via the landline;
determine another processing instruction, of the one or more processing instructions, based on information included in the other alarm signal,
    the other processing instruction directing the device to translate the other alarm signal to a packet-based message,
translate the other alarm signal to the packet-based message based on the other processing instruction; and
provide the packet-based message to the monitoring device.

19. The non-transitory computer-readable medium of claim 15, where the communication session is a voice over internet protocol (VoIP) session,
where the plurality of instructions further cause the one or more processors to:
    transmit or receive a data flow towards or from the user device via the VoIP session.

20. The non-transitory computer-readable medium of claim 15, where the information included in the alarm signal identifies a particular terminal via which the alarm panel device receives an electrical signal corresponding to an occurrence of an event,
where one or more instructions, of the plurality of instructions, to determine the particular processing instruction, cause the one or more processors to determine the particular processing instruction based on the particular terminal,
    the one or more processing instructions being different for different terminals from which the alarm signal is able to be received.

* * * * *